No. 739,312. PATENTED SEPT. 22, 1903.
A. H. HILL.
NUTMEG GRATER.
APPLICATION FILED JUNE 30, 1903.
NO MODEL.
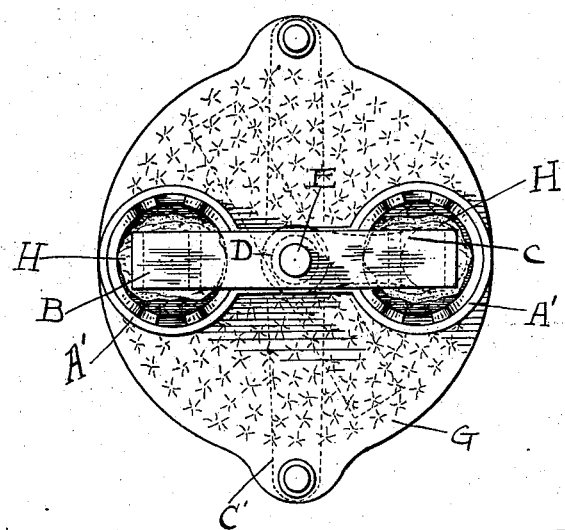
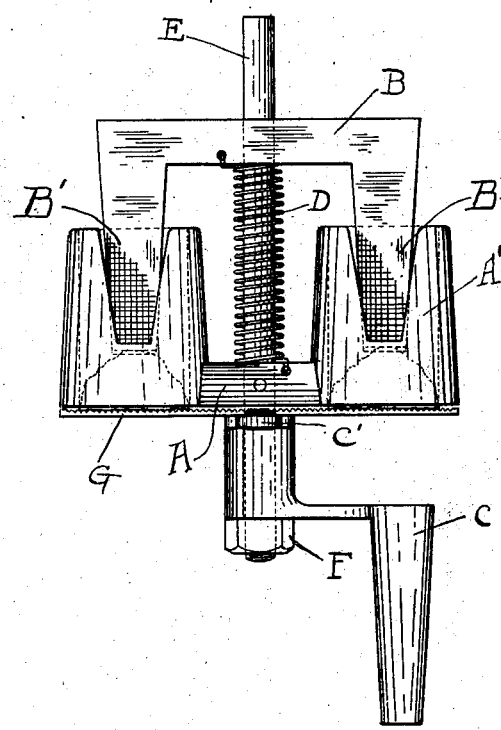
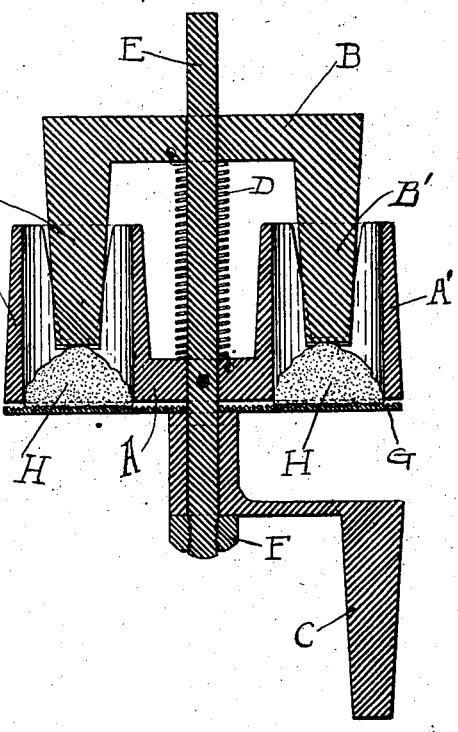
Witnesses,
Kate S. Taft.
Harrison W. Rugg.
Inventor,
Alfred H. Hill.
By Oscar A. Taft, Att'y.

No. 739,312. Patented September 22, 1903.

UNITED STATES PATENT OFFICE.

ALFRED H. HILL, OF STERLING, MASSACHUSETTS, ASSIGNOR OF ONE-HALF TO HARRISON W. RUGG, OF STERLING, MASSACHUSETTS.

NUTMEG-GRATER.

SPECIFICATION forming part of Letters Patent No. 739,312, dated September 22, 1903.

Application filed June 30, 1903. Serial No. 163,694. (No model.)

*To all whom it may concern:*

Be it known that I, ALFRED H. HILL, of Sterling, in the county of Worcester and State of Massachusetts, have invented certain new and useful Improvements in Nutmeg-Graters; and I do hereby declare that the following is a full, clear, and exact description of the same, reference being had to the accompanying drawings, forming a part of this specification, and in which—

Figure 1 represents a top or plan view of my said improved nutmeg-grater. Fig. 2 is a side view thereof, and Fig. 3 is a central vertical section of the grater.

The object of my invention is to provide a simple and effective nutmeg-grating device whereby several nutmegs may be grated at the same time and also reduce the liability of injury to the fingers as by the old way of holding the nutmeg in the fingers and rubbing it against a roughened surface.

Said invention consists of a transverse plate having a roughened or grating surface and attached to the hub of a handle for turning the same, which is fitted to turn upon a central longitudinal shaft, and of a spring holding device for holding the nutmegs with a yielding pressure against said roughened surface to grate the same by turning the handle of the grater, as will be hereinafter more fully set forth.

To enable others to better understand the nature and purpose of my said invention, I will now proceed to describe it more in detail.

Referring to the drawings, G represents the grating-disk, which is attached at opposite sides to the ends of a bar C', which is in turn formed upon or secured to the hub of a handle C. The hub of said handle C is fitted to turn loose on a central longitudinal shaft E, being held in position longitudinally thereon between the nut F on the end of said shaft and the inner side of the central part of the nutmeg-holder A, which is secured rigidly to shaft E. Said nutmeg-holder is in this instance provided with two cup-shaped receptacles A' A' to receive the nutmegs H. Said receptacles are open at both ends—at one end to admit the nutmegs and at the other end to permit said nutmegs to come in contact with the grating surface, as is shown in the drawings. The nutmegs are each held against said grating surface with quite a strong yielding pressure, so as to grate them when disk G is turned by means of a transverse frame B, fitted to slide on shaft E and having two longitudinally-projecting arms B' B', whose ends extend into the receptacles A' A' and bear against the nutmegs on their opposite sides from the grating-surface. Pressure is imparted to said frame B to hold the nutmegs, as aforesaid, by means of a spiral spring D, fitted over shaft E between frame B and holder A and attached one end to said frame and the other end to said holder.

By the foregoing construction it is obvious that a constant yielding pressure is imparted to press the nutmegs against the grating-disk, and therefore when handle C is turned to rotate said disk the nutmeg will be grated in a similar way to grating them in the usual way by hand. In thus grating the same the nutmeg-holding part of the device is held in one hand and the disk turned by the other. The manipulation of the device, as will be seen, is very simple and convenient to perform, and the nutmegs may be very evenly grated. When one set of nutmegs has been grated away, another set may be supplied by pulling outward on frame B to withdraw its arms B' B' from receptacles A' A' and turning the same, as is shown by dotted lines in Fig. 1, so that the nutmegs may be placed in said receptacles, and thus replacing said holding-arms in the receptacles over said nutmegs.

As before stated, only two receptacles and holding-arms for the nutmegs are shown on the device; but, if desired, more than this number may be employed in practice without departing from the principle of my invention. I also reserve the right to make such modifications in the construction as circumstances may require coming within the scope of said invention.

Having now described my invention, what I claim therein as new, and desire to secure by Letters Patent, is—

1. A nutmeg-grater, comprising in combination, a transverse, roughened surface, grating-disk, a handle to whose hub said disk is secured and fitted to turn on a central, longitudinal shaft, means for holding said handle in position longitudinally on said shaft, a nutmeg-holder attached to said shaft and having suitable receptacles for the nutmegs, a frame fitted to slide on the shaft and having arms extending into said receptacles, also adapted to bear against said nutmegs, and a spring attached at one end to the holder, and the other end to the frame, substantially as and for the purpose set forth.

2. In a nutmeg-grater, the combination of a rotatable, transverse, grating-disk, fitted to turn on the central shaft, with a nutmeg-holder secured to said shaft, a frame fitted to slide on the shaft and adapted to bear against the nutmegs in said holder, and a spring for exerting an inward, yielding pressure on said frame, substantially as and for the purpose set forth.

ALFRED H. HILL. [L. S.]

Witnesses:
KATE S. TAFT,
H. W. HARRISON.